United States Patent [19]

Hashi et al.

[11] Patent Number: 5,337,304
[45] Date of Patent: Aug. 9, 1994

[54] OPTICAL INFORMATION RECORDING/REPRODUCING APPARATUS

[75] Inventors: Hiroshi Hashi; Tsuyoshi Togawa, both of Tokyo, Japan

[73] Assignee: Olympus Optical Co., Ltd., Tokyo, Japan

[21] Appl. No.: 894,848

[22] Filed: Jun. 5, 1992

[30] Foreign Application Priority Data

Jun. 17, 1991 [JP] Japan ................................. 3-170433
Jul. 10, 1991 [JP] Japan ................................. 3-169777
Jul. 15, 1991 [JP] Japan ................................. 3-173835

[51] Int. Cl.$^5$ .................... G11B 17/30; G11B 23/00
[52] U.S. Cl. .................... 369/215; 369/258; 235/475; 235/479
[58] Field of Search .............. 369/215, 258; 235/475, 235/479, 482

[56] References Cited

U.S. PATENT DOCUMENTS

| | | | |
|---|---|---|---|
| 4,157,246 | 10/1992 | Nakanishi | 235/482 |
| 4,593,328 | 6/1986 | Baus, Jr. | 235/482 |
| 4,706,234 | 11/1987 | Okada | 369/215 |
| 4,950,876 | 8/1990 | Saito | 235/479 |
| 5,039,849 | 8/1991 | Tano et al. | 235/479 |
| 5,130,521 | 7/1992 | Shino et al. | 369/258 |
| 5,146,069 | 9/1992 | Orimoto et al. | 235/479 |
| 5,189,661 | 2/1993 | Honda et al. | 369/258 |

FOREIGN PATENT DOCUMENTS

| | | | |
|---|---|---|---|
| 62-97174 | 5/1987 | Japan . | |
| 63-25868 | 2/1988 | Japan . | |
| 0032759 | 2/1988 | Japan | 369/258 |
| 63-66770 | 3/1988 | Japan . | |
| 0205853 | 8/1988 | Japan | 369/258 |
| 2-172018 | 7/1990 | Japan . | |

Primary Examiner—Richard A. Bertsch
Assistant Examiner—Howard R. Richman
Attorney, Agent, or Firm—Frishauf, Holtz, Goodman & Woodward, P.C.

[57] ABSTRACT

There is disclosed an optical information recording/reproducing apparatus for recording/reproducing information on/from an optical card having a plurality of tracks. The apparatus comprises a frame having a convey path for the optical card, an optical head for recording/reproducing information on/from the optical card, the optical head being movable in a direction perpendicular to information tracks on the optical card, an moving mechanism for moving the optical card along the convey path relative to the optical head, and a detecting mechanism for detecting the amount of movement of the optical card. The detecting mechanism has two drive rollers which are put in contact with the optical card to rotate in accordance with the movement of the optical card.

12 Claims, 14 Drawing Sheets

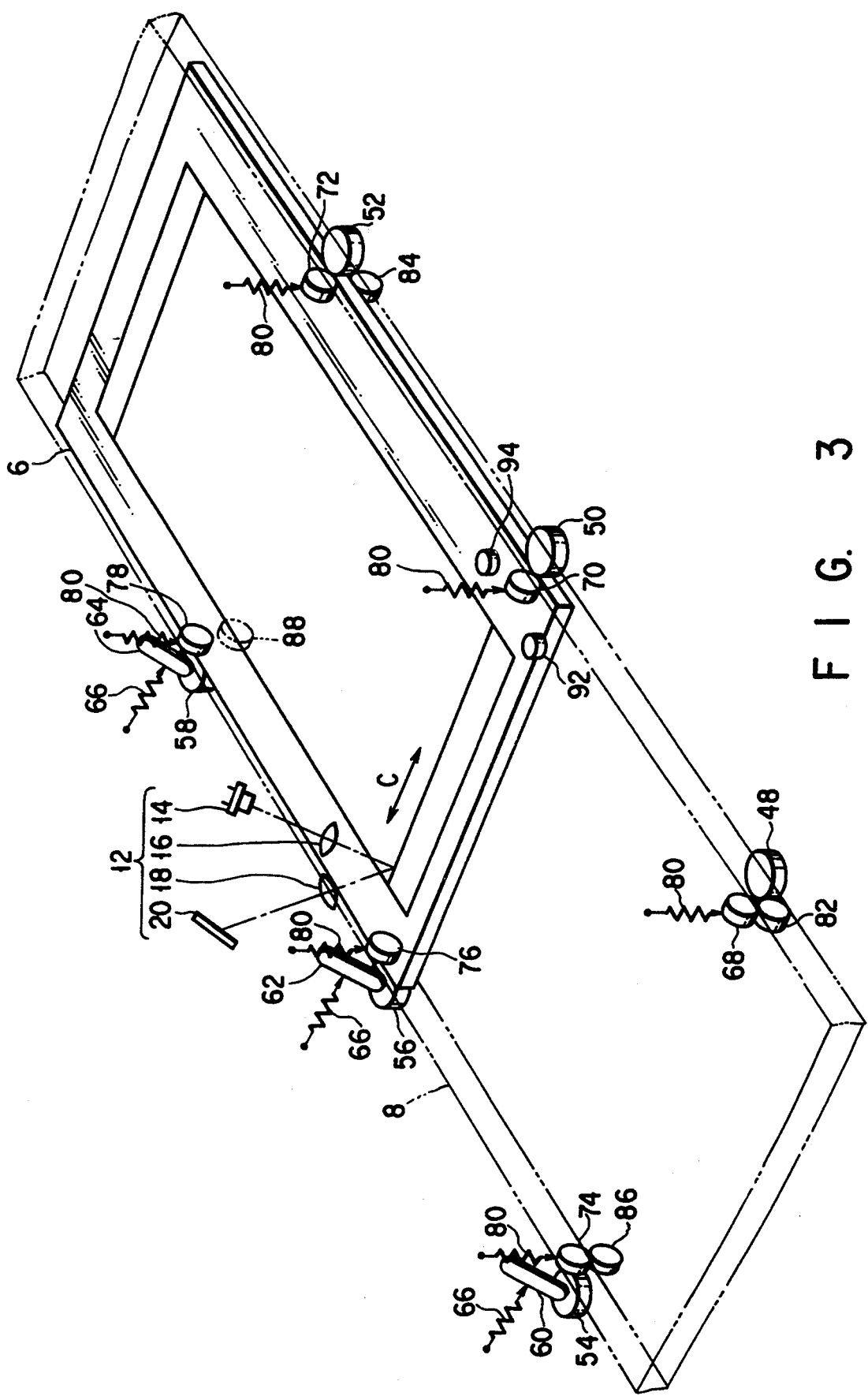

FIG. 4A
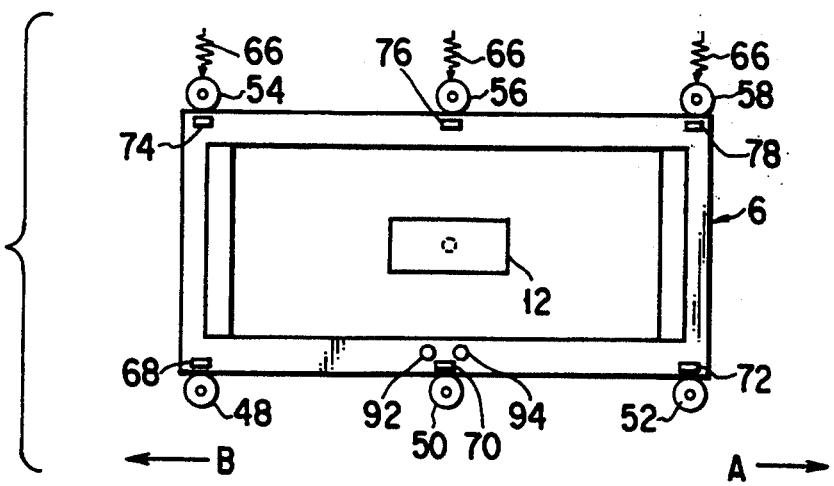
FIG. 4B
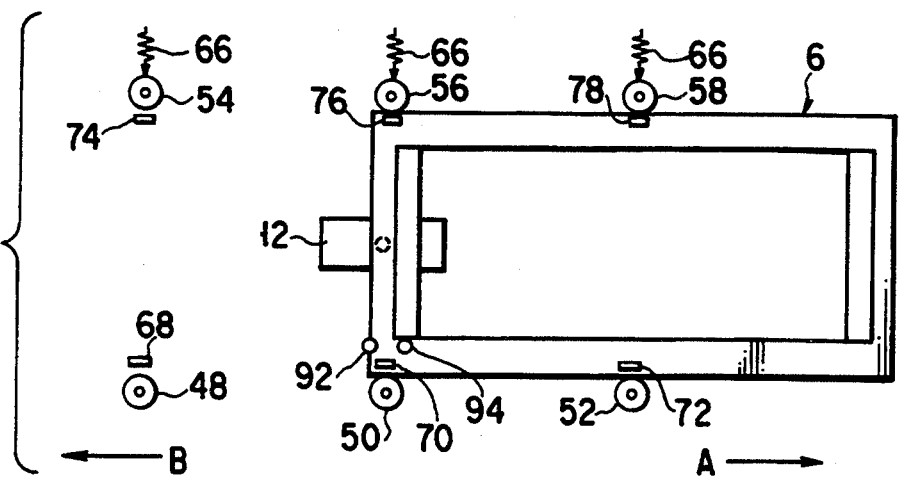
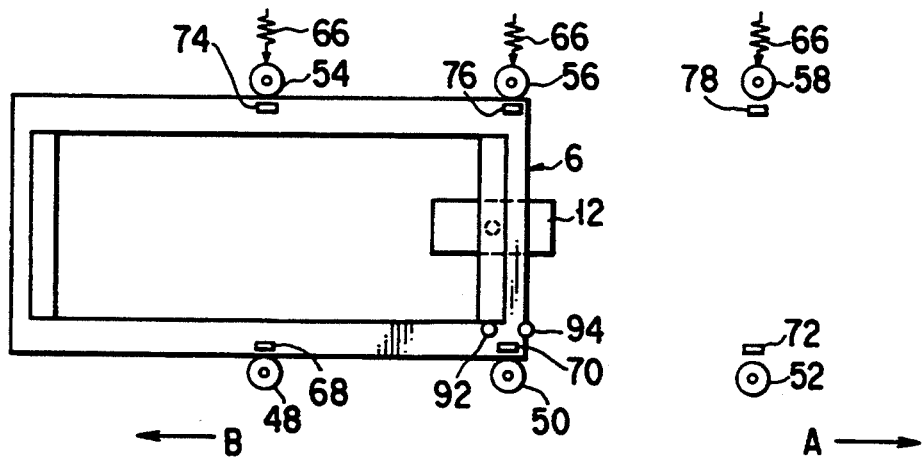
FIG. 4C

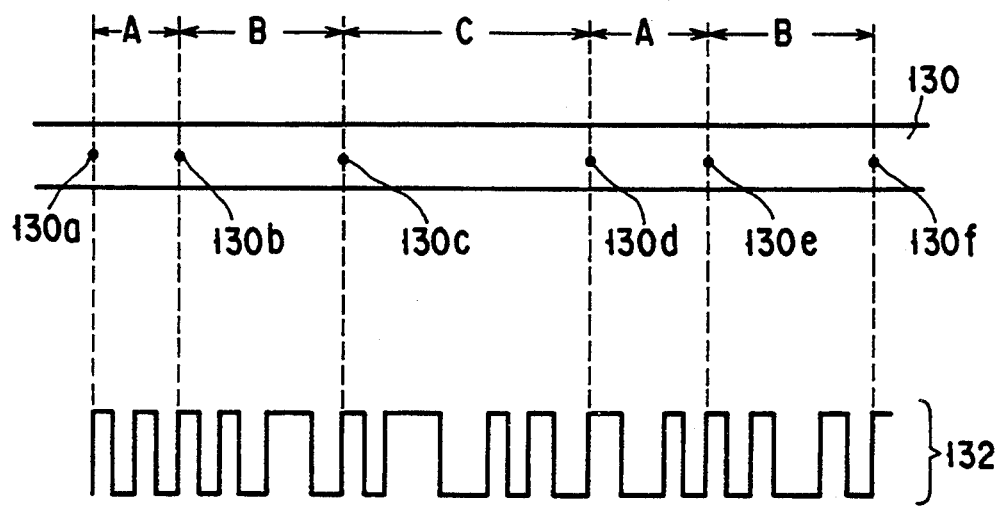
F I G. 10

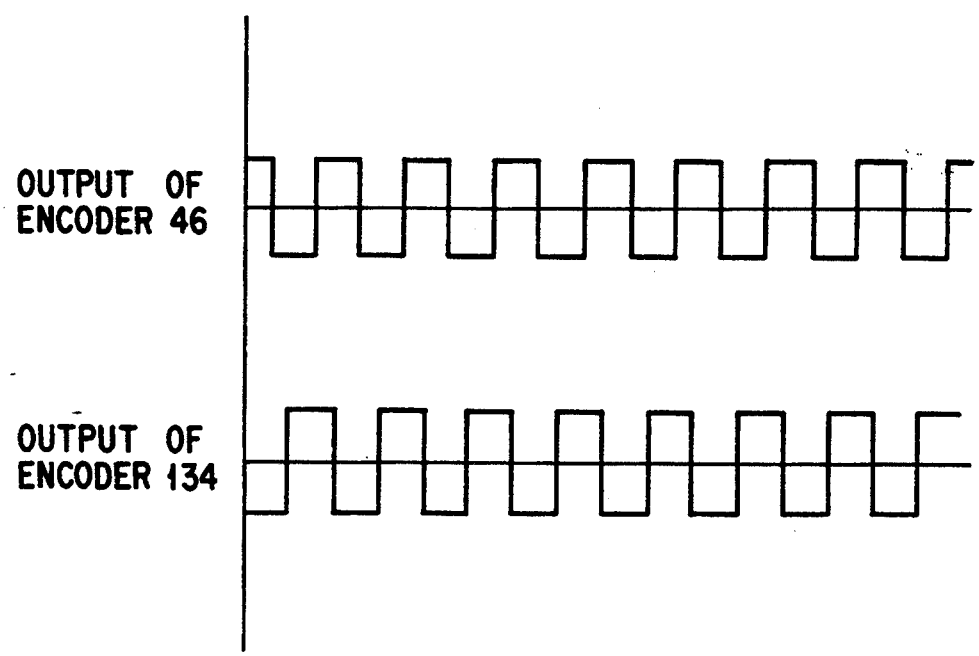
F I G. 13
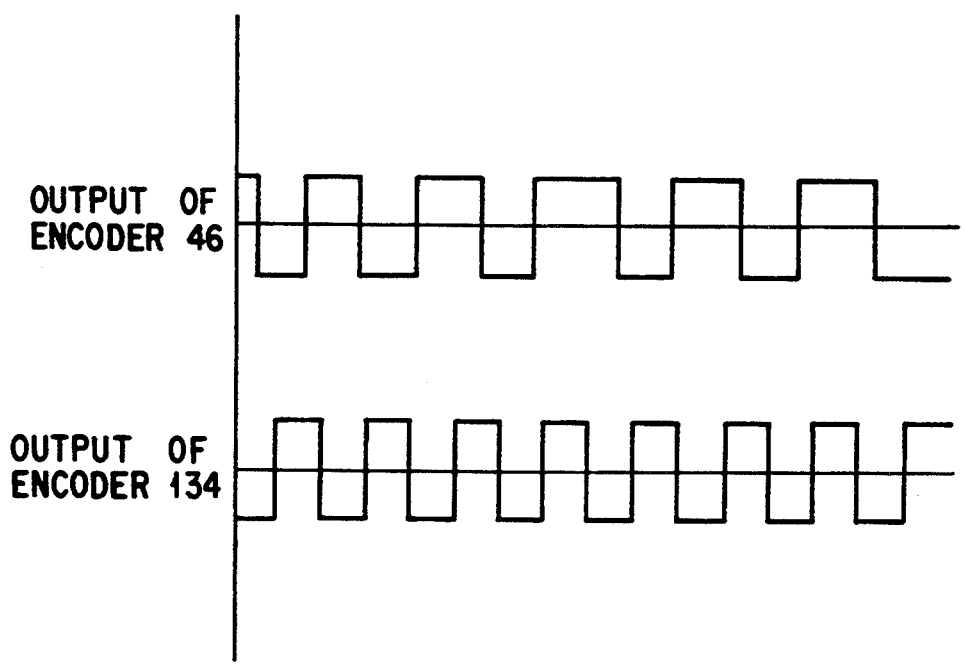
F I G. 14

OPTICAL INFORMATION RECORDING/REPRODUCING APPARATUS

BACKGROUND OF THE INVENTION

1. Field of the Invention

The present invention relates to an optical information recording/reproducing apparatus for recording/reproducing information on/from an information recording medium such as an optical card. The term "recording/reproducing apparatus" means a recording apparatus for recording information on an information recording medium, a reproducing apparatus for reproducing information recorded on an information recording medium, and a recording/reproducing apparatus for recording and reproducing information.

2. Description of the Related Art

An optical card has a memory capacity several thousand times to ten thousand times greater than that of a magnetic card. Unlike the magnetic card, the optical card is not rewritable; however, since the optical card has a memory capacity of 1 to 2 Mbytes, it will be widely applied to bankbooks, portable maps, and prepaid cards.

There is a demand for a portable, cost-effective optical information recording/reproducing apparatus for recording/reproducing information on/from an optical card.

Roller movement type optical information recording/reproducing apparatuses are disclosed, for example, in Published Unexamined Japanese Patent Application (PUJPA) No. 63-66770 and PUJPA No. 1-172018. In these apparatuses, an inserted optical card is moved directly by means of driving rollers. An optical head is moved relative to the optical card for information recording/reproducing.

During information recording/reproducing, the speed of the optical card is detected. A clock pattern for generating clock signals is formed on the optical card along the information tracks. Thus, the speed is detected by the clock signals. Based on the detected speed, the speed of the optical card is optimized.

On the other hand, PUJPA No. 62-97174 discloses an apparatus for stably moving an optical card at a fixed speed, without detecting the speed of the optical card.

In this apparatus, a pair of rollers (i.e. a driving roller and a driven roller) are arranged below an optical head. An optical card is clamped between these rollers and moved reciprocally. There are provided other rollers outside the range of reciprocal movement of the optical card. Since the optical card is moved only by the paired rollers, it can stably be moved at a fixed speed.

There is also known an apparatus wherein a shuttle on which an optical card is placed is moved, and the card is not moved by means of rollers. A clock pattern is not formed on the optical card used in this apparatus, and the speed of the card is detected by using a motor having an encoder.

In the apparatuses disclosed in PUJPA No. 63-66770 and PUJPA No. 1-172018, however, a data area for a user on the optical card is reduced since the clock pattern is formed on the card.

In addition, an optical card without a clock pattern cannot be used in this apparatus. That is, the optical card for the apparatus detecting its speed without a clock pattern cannot be used. Thus, compatibility between the apparatuses using and not using the shuttle is lost.

In the apparatus wherein the optical card is moved by only the rollers, a single rotation of the roller does not coincide with a single rotation of the motor. This is due to backlash of gears in a transmission mechanism provided between the motor (i.e. driving source) and the driving roller, or slack in a belt. Thus, in order to move the optical card at an exact speed, the speed of the card must be detected. Unless the speed of the card is detected, exact information recording/reproducing cannot be performed on the optical card.

SUMMARY OF THE INVENTION

The present invention has been made in consideration of the above problems, and its object is to provide an optical information recording/reproducing apparatus capable of recording/reproducing information on/from an optical card exactly without a clock pattern.

According to the present invention, an optical information recording/reproducing apparatus for recording/reproducing information on/from an optical card having a plurality of tracks, comprises: a frame having a convey path for the optical card; an optical head for recording/reproducing information on/from the optical card, the optical head being movable in a direction perpendicular to information tracks on the optical card; means for moving the optical card relative to the optical head; and means for detecting the amount of movement of the optical card, the detecting means having a rotational member contacting the optical card to rotate in accordance with the movement of the optical card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view showing an internal structure of the apparatus shown in FIG. 1, in which driving rollers are not shown;

FIG. 4A to FIG. 4C are top views showing the relationship between the optical card and rollers when the card is moved reciprocally;

FIG. 10 shows a plurality of pits within an information track of the optical card, and a pulse signal from an encoder unit;

FIG. 13 shows output signals from two encoders when the driving rollers do not slip on the optical card;

FIG. 14 shows output signals from two encoders when the driving rollers slip on the optical card.

DETAILED DESCRIPTION OF THE PREFERRED EMBODIMENTS

A first embodiment of an optical information recording/reproducing apparatus according to the present invention will now be described with reference to FIGS. 1 to 5.

Figure 1:
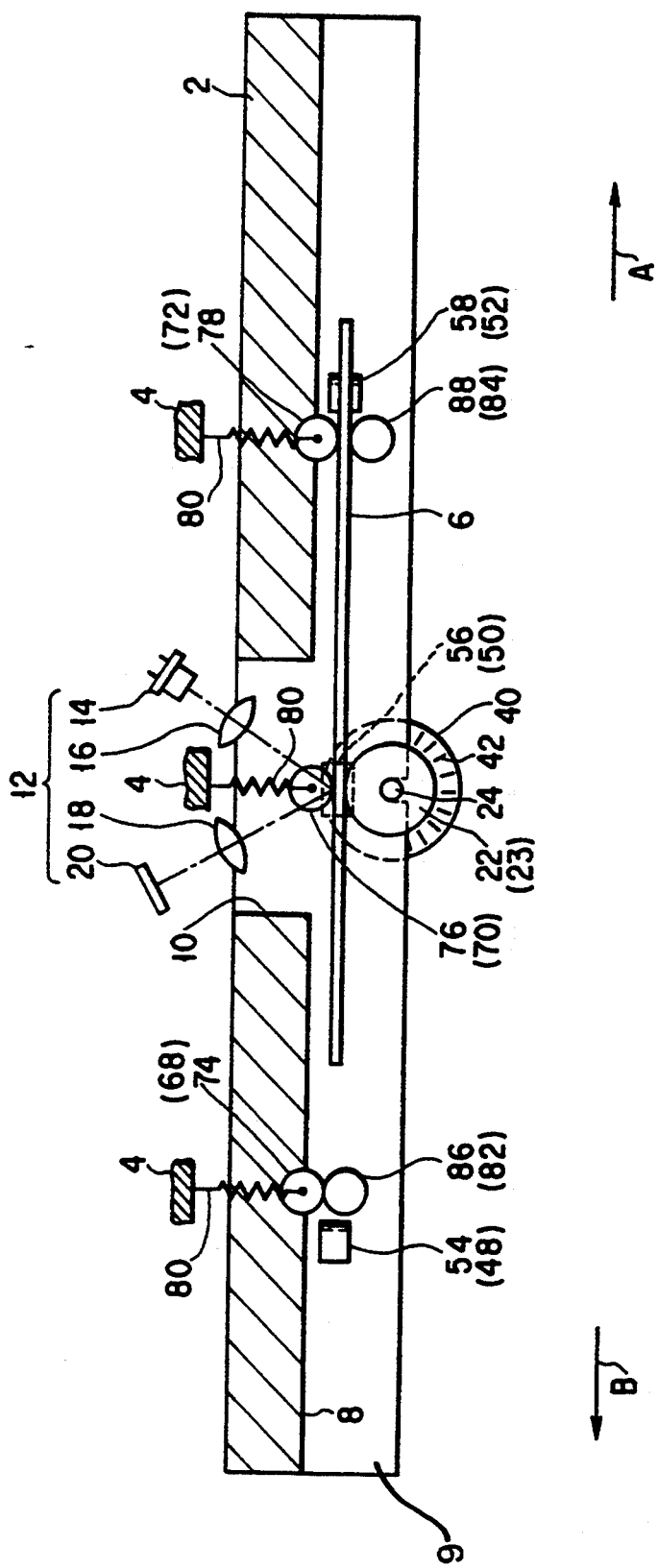
FIG. 1 is a cross-sectional view showing an optical information recording/reproducing apparatus according to a first embodiment of the present invention.

Referring to FIG. 1, numeral 2 denotes a frame situated within a housing 4 of the apparatus. Only part of the housing 4 is shown for the purpose of simplicity. A convey path 8 along which an optical card 6 is moved is formed in the frame 2. The convey path 8 extends in the directions of arrows A and B, i.e. in the direction of movement of the card 6. An insert hole 9 is formed in front of the frame 2 (on the left in FIG. 1) and the convey path 8 leads to the outside of the frame 2.

An opening 10 is formed in an upper part of the frame 2. An optical head 12 is situated in the opening 10. The optical head 12 is movable in a direction (indicated by arrow C in FIG. 3) perpendicular to the directions of arrows A and B (i.e. in the width direction of the optical card 6), in order to seek the tracks on the optical card 6. The optical head 12 comprises a light-emitting diode 14, an illumination lens 16, an objective lens 18 and a photodetector 20.

Figure 2:
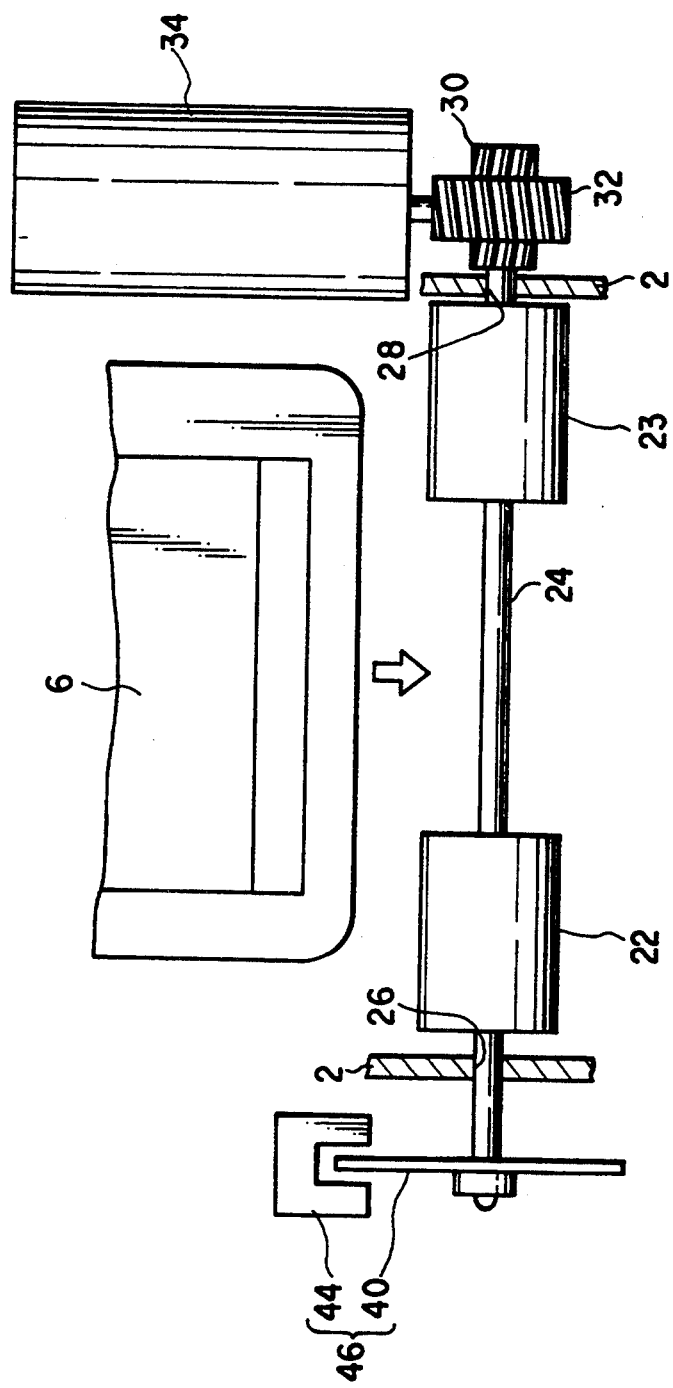
FIG. 2 is a top view of a driving system of the apparatus shown in FIG. 1.
Figure 5:
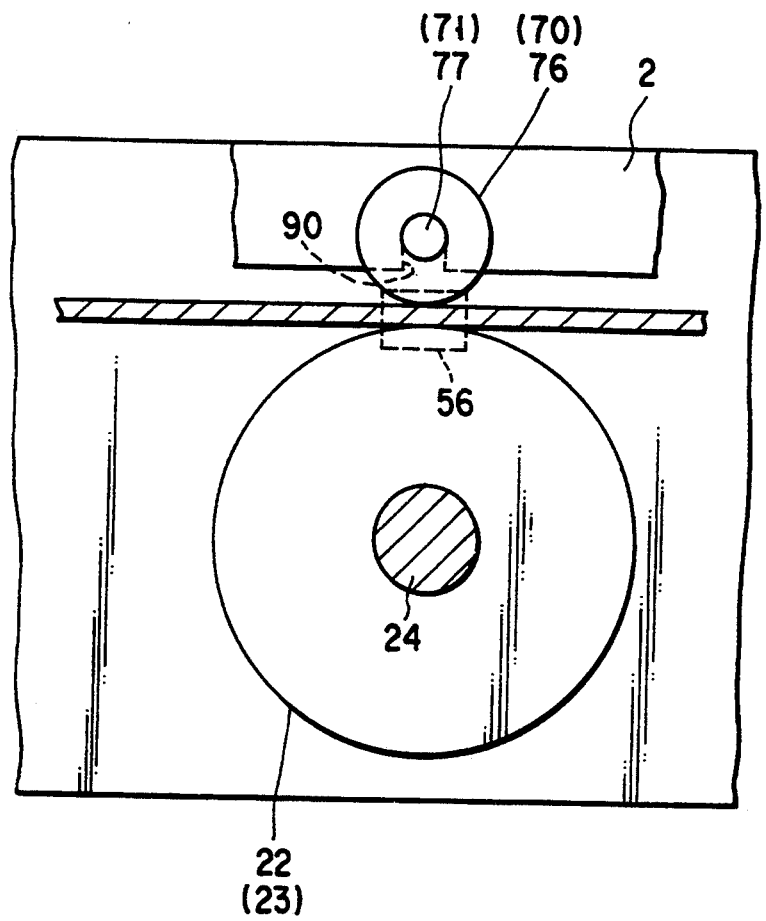
FIG. 5 is a partly cutaway side view of the driving roller shown in FIG. 1.

Two driving rollers (rotating members) 22 and 23 are provided below the convey path 8. Only one driving roller 22 is shown in FIG. 1 for the purpose of simplicity. The driving rollers 22 and 23 are formed of a material such as rubber with a relatively high friction coefficient. As is shown in FIG. 2, the driving rollers 22 and 23 are fixed on a driving shaft 24. The driving shaft 24 extends in the direction of movement of the optical head 12. The frame 2 has two holes 26 and 28 in which both end portions of the shaft 24 are supported to be freely rotatable.

A gear 30 is secured to one end portion of the driving shaft 24 (the right end portion in FIG. 2). The gear 30 is meshed with a worm gear 32. The worm gear 32 is attached to an output shaft of a motor 34. The torque of the motor 34 is transmitted to the driving shaft 24 and driving rollers 22 and 23. A scale plate 40, which is rotatable in accordance with rotation of the driving shaft 24, is attached to the other end portion of the shaft 24. A recognition pattern 42, as shown in FIG. 1, is formed on the surface of the scale plate 40. The recognition pattern 42 comprises slits arranged equidistantly along its peripheral portion.

As is shown in FIG. 2, a U-shaped detector 44 is attached to the frame 2 (shown in FIG. 1) so as to read the recognition pattern 42 of the scale plate 40. The detector 44 includes a light-emitting element and a light-receiving element. A light beam emitted from the light-emitting element towards the light-receiving element is transmitted through the scale plate 40 and interrupted by the plate 40 alternately, whereby the detector 44 detects the rotation of the scale plate 40. The detector 44 and the scale plate 40 constitute an encoder unit 46 (movement amount detecting means).

As is shown in FIG. 3, first three rollers 48, 50 and 52, which are situated horizontally and rotatable about vertical axes, are disposed on one side of the convey path 8. One side face of the optical card 6 is guided by the rollers 48, 50 and 52. The first rollers 48, 50 and 52 are arranged equidistantly. As is shown in FIG. 4A, the distance between the rollers 48 and 52 is almost equal to the longitudinal length of the optical card 6.

Second three rollers 54, 56 and 58, which are situated horizontally and rotatable about vertical axes, are disposed on the other side of the convey path 8. The other side face of the optical card 6 is guided by the rollers 54, 56 and 58. The second rollers 54, 56 and 58 are rotatably attached to end portions of arms 60, 62 and 64. The proximal end portions of the arms 60, 62 and 64 are pivotably attached to the frame 2 (shown in FIG. 1). Urging springs 66 are coupled, at one end, to middle portions of the arms 60, 62 and 64. Thus, the second horizontal rollers 54, 56 and 58 are urged towards the first horizontal rollers 48, 50 and 52. The first and second horizontal rollers cooperate to stably move the optical card 6.

The first and second horizontal rollers 50 and 56, which are both situated at an almost middle position of the convey path, are arranged along the direction C in which the optical head 12 moves.

First three upper rollers 68, 70 and 72, which are rotatable about horizontal axes, are provided on one side of the convey path 8. Second three upper rollers 74, 76 and 78, which are rotatable about horizontal axes, are provided on the other side of the convey path 8. As is shown in FIG. 3, the first and second upper rollers 70 and 76, which are both situated at an almost middle position of the convey path 8, are arranged along the direction C in which the optical head 12 moves. A rotational shaft 77 (71) of the upper roller 76 (70) is loosely fitted in a notch 90 formed in the frame 2, so that the shaft 77 (71) is vertically movable and rotatable. The other first and second upper rollers 68, 72, 74 and 78 are similarly mounted on the frame 2 via rotational shafts.

Referring back to FIG. 1, first end portions of urging springs 80 are abutted to the rotational shafts of the first and second upper rollers 68 to 78 or engaged with them through bearings, and second end portions of the springs 80 are attached to the housing 4. The upper rollers 68 to 78 are urged by the urging springs 80 to guide the upper surface of the optical card 6.

As is shown in FIG. 3, two first lower rollers 82 and 84, which are rotatable about horizontal axes, are provided below the two first upper rollers 68 and 72. Two second lower rollers 86 and 88, which are rotatable about horizontal axes, are provided below the two second upper rollers 74 and 78. These first and second lower rollers 82 to 88 guide the lower surface of the optical card 6.

The frame 2 (shown in FIG. 1) is provided with sensors 92 and 94, as shown in FIG. 3, each having a light-emitting element and a light-receiving element for detecting the front and rear ends of the optical card 6.

The operation of the apparatus of the first embodiment having the above structure will now be described.

When the optical card 6 is inserted into the insert hole 9, the insertion of the card 6 is detected by sensors (not shown) and the motor 34 is driven. The torque of the motor 34 is transmitted to the driving shaft 24 via the worm gear 32 and the gear 30. Accordingly, the driving rollers 22 and 23 are rotated to reciprocally move the optical card 6 along the convey path 8 shown in FIG. 1.

In this case, the motor 34 is controlled by output signals from the sensors 92 and 94 so as to control the rotational direction of the rollers 22 and 23. Thereby, the direction of movement of the card 6 is determined.

The optical card 6 is guided by the rollers, with its lower surface pressed on the driving rollers 22 and 23. The optical card is reciprocally moved in accordance with the rotation of the driving rollers. At this time, the card 6 is moved by the frictional force acting between the lower surface of the card 6 and the driving rollers 22 and 23. When the resistance of the optical card 6 at the time of movement becomes greater than the torque of the driving rollers 22 and 23, the rollers 22 and 23 slip on the card 6 and cannot exactly move the card 6. However, since the weight of the optical card 6 is very light (accordingly the inertia of the card 6 is small) and the card 6 is guided by the rollers only, the resistance of the card 6 is much lower than the torque of the driving rollers 22 and 23. Thus, there is little possibility of slip.

When the driving shaft 24 rotates, the scale plate 40 (shown in FIG. 2) rotates along with the shaft 24. Accordingly, the variation in speed of the optical card 6 can be detected by the detector 44. Thus, the speed of the card 6 and the variation in speed can always be monitored.

As has been described above, since the driving shaft 24 extends in the direction of movement of the optical head 12 and encoder unit 46 is provided there, the rotation speed of the shaft 24 is detected at a position just below the head 12. Thus, the speed can exactly be detected.

It is possible to obtain a clock signal on the basis of the output signal from the detector. The obtained clock signal can be synchronized with the processing of the input signal to the light-emitting diode 14 which functions as a light source, or with the processing of the output signal from the data read unit. Thereby, stable data recording/reproducing can be performed, irrespective of the variation in speed of the card 6. In addition, the speed of the card 6 can be controlled by supplying the clock signal to speed controlling means.

Information is recorded/reproduced in/from the optical card while the optical card 6 is moved between the position shown in FIG. 4A and the position in FIG. 4C.

In the state shown in FIG. 4A, the optical card 6 is positioned at the almost center of the convey path (shown in FIG. 1) and all rollers are put in contact with the card 6.

When the card 6 moves in the direction of arrow A, it becomes out of contact with the rollers 54, 74, 48 and 68, as shown in FIG. 4B.

When the card 6 moves in the direction of arrow B, it becomes out of contact with the rollers 58, 78, 52 and 72, as shown in FIG. 4C.

However, the rollers 56, 76, 50 and 70 are always in contact with the optical card 6, irrespective of the position of the card 6 in FIGS. 4A to 4C. In addition, the driving rollers 22 and 23 (shown in FIG. 1) are always in contact with the card 6.

Accordingly, by disposing the scale plate 40 on the driving shaft 24 on which the driving rollers 22 and 23 are mounted as in this embodiment, the speed of the optical card 6 can always be monitored. Further, by using the disc-like scale plate 40 as a part of the encoder unit 46, the simplest structure of the speed detection means can be achieved. Moreover, by attaching the scale plate 40 to the driving shaft 24, the speed of the card 6 can be detected at a position closest to the position where information recording/reproducing is performed.

In order to provide the encoder unit on rollers other than the rollers which are always in contact with the optical card 6, the speed of the card 6 cannot be detected constantly unless encoder units are provided at least at two positions.

A modification of the first embodiment will now be described with reference to FIG. 6.

Figure 6:
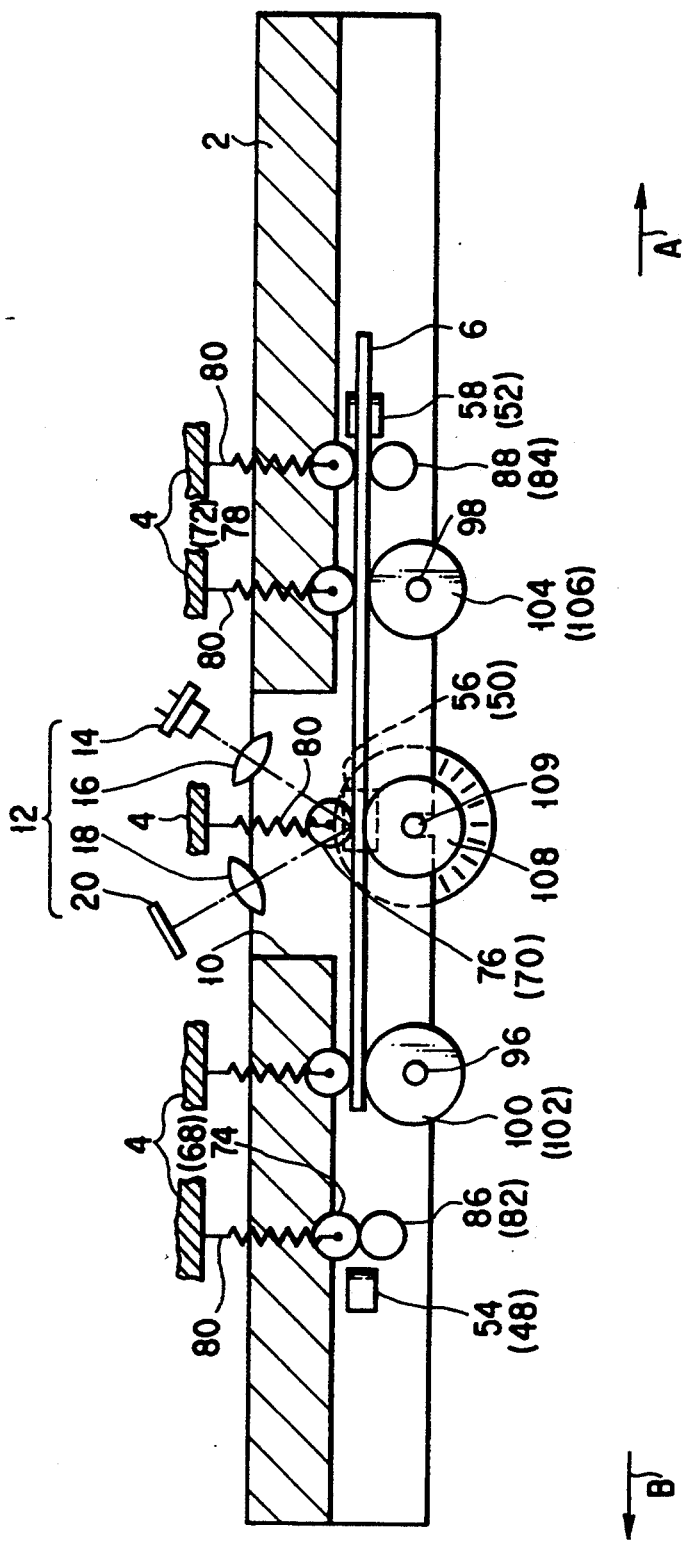
FIG. 6 is a cross-sectional view showing a modification of the apparatus according to the first embodiment.

In FIG. 6, two driving shafts 96 and 98 having driving rollers 100 (102) and 104 (106) are provided along the convey path 8. A driven roller 108 is rotatably situated between the two shafts 96 and 98 and is disposed in a position where it opposes the optical head to interpose the optical card therebetween. A driven rotational shaft 109 as a rotational center axis of the driven roller 108 extends in the direction in which the optical head 12 moves. The scale plate 40 is attached to one end portion of the driven shaft 109. The other structures are common to those of the first embodiment.

By this structure, the same advantages as in the first embodiment can be obtained, and the optical card can be moved surely and stably by the two driving shafts having the driving rollers.

A second embodiment of the invention will now be described with reference to FIGS. 7 to 10. The structural elements common to the first embodiment are denoted by same reference numerals, and a description thereof is omitted.

In the second embodiment, the distance between the outside end faces of the driving rollers 22 and 23 is equal to the width of the optical card 6, and the distance between the inside end faces of the rollers 22 and 23 is greater than the width of the information pattern 7 on the card 6.

A first gear 110 is attached coaxially to a left end portion of the driving shaft 24. The motor 34 is fixed to the frame in the vicinity of the first gear 110. The first gear 110 is meshed with a second gear 112. The second gear 112 has a smaller diameter than the gear 110 and is attached to an end portion of the rotational shaft of the motor 34. The motor 34 is electrically connected to a control circuit 114 shown in FIG. 9.

A first driven shaft 116 is rotatably journaled on the frame above the left driving roller 22. A first driven roller 118 is attached coaxially to a right end portion of the first driven shaft 116. A second driven shaft 120 is rotatably journaled on the frame above the right driving roller 23. A second driven roller 122 is attached coaxially to a left end portion of the second driven shaft 120. The thin disc-shaped scale plate 40 is fixed coaxially to a right end portion of the second driven shaft 120.

The distance between the outer peripheral surface of the first driven roller 118 and the outer peripheral surface of the left driving roller 22 and the distance between the outer peripheral surface of the second driven roller 122 and the outer peripheral surface of the right driving roller 23 are slightly less than the thickness of the optical card 6. As a result, the first and second driven rollers 118 and 122 are always put in contact with the optical card 6, and are rotated in accordance with the movement of the optical card 6.

Figure 9:
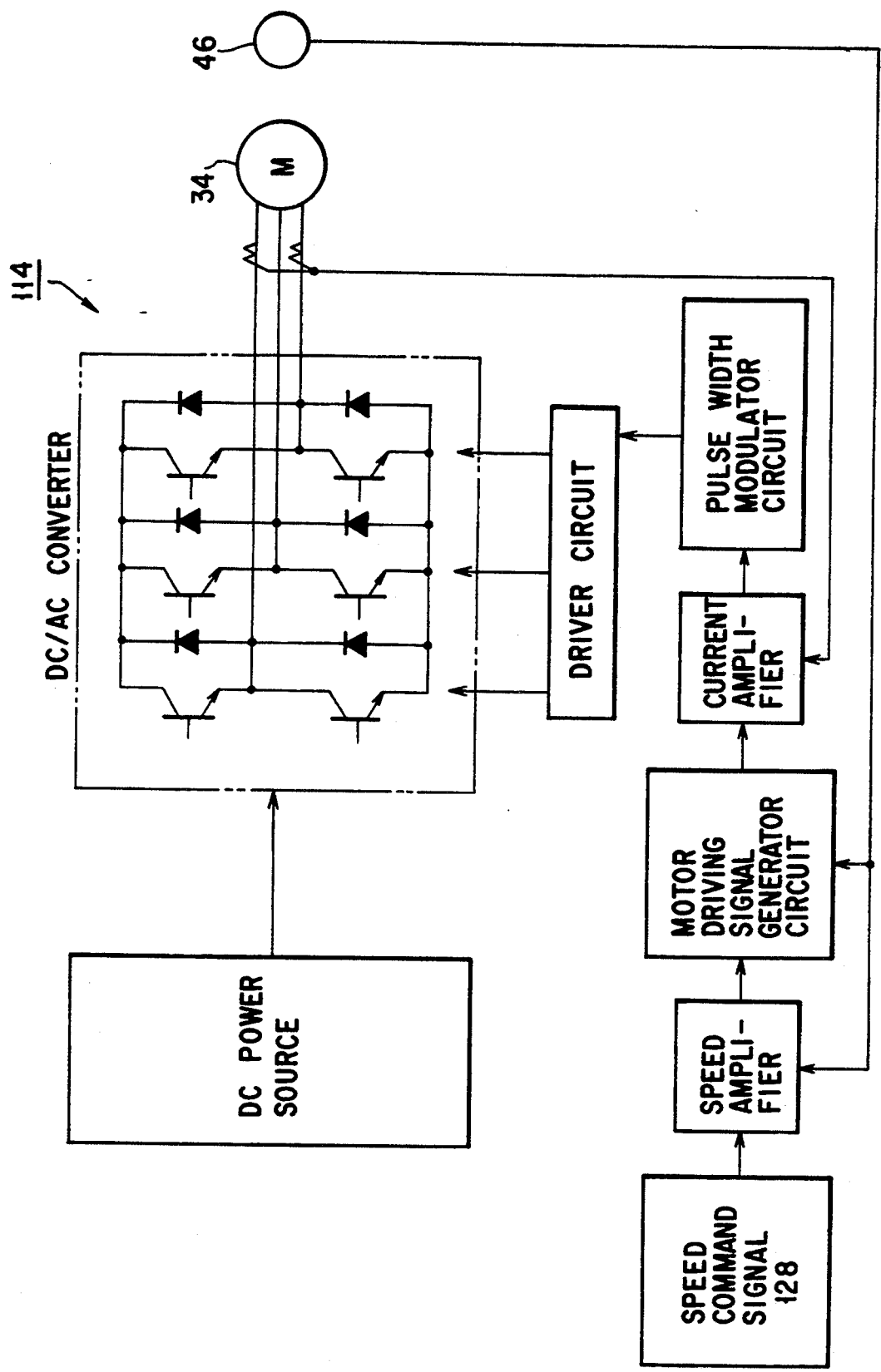
FIG. 9 is a circuit diagram showing a control circuit used in the apparatus shown in FIG. 7.

The encoder unit 46 is electrically connected to the control circuit 114 shown in FIG. 9. The speed of the motor 34 is controlled on the basis of the speed of the optical card 6 detected by the encoder 46.

Figure 8:
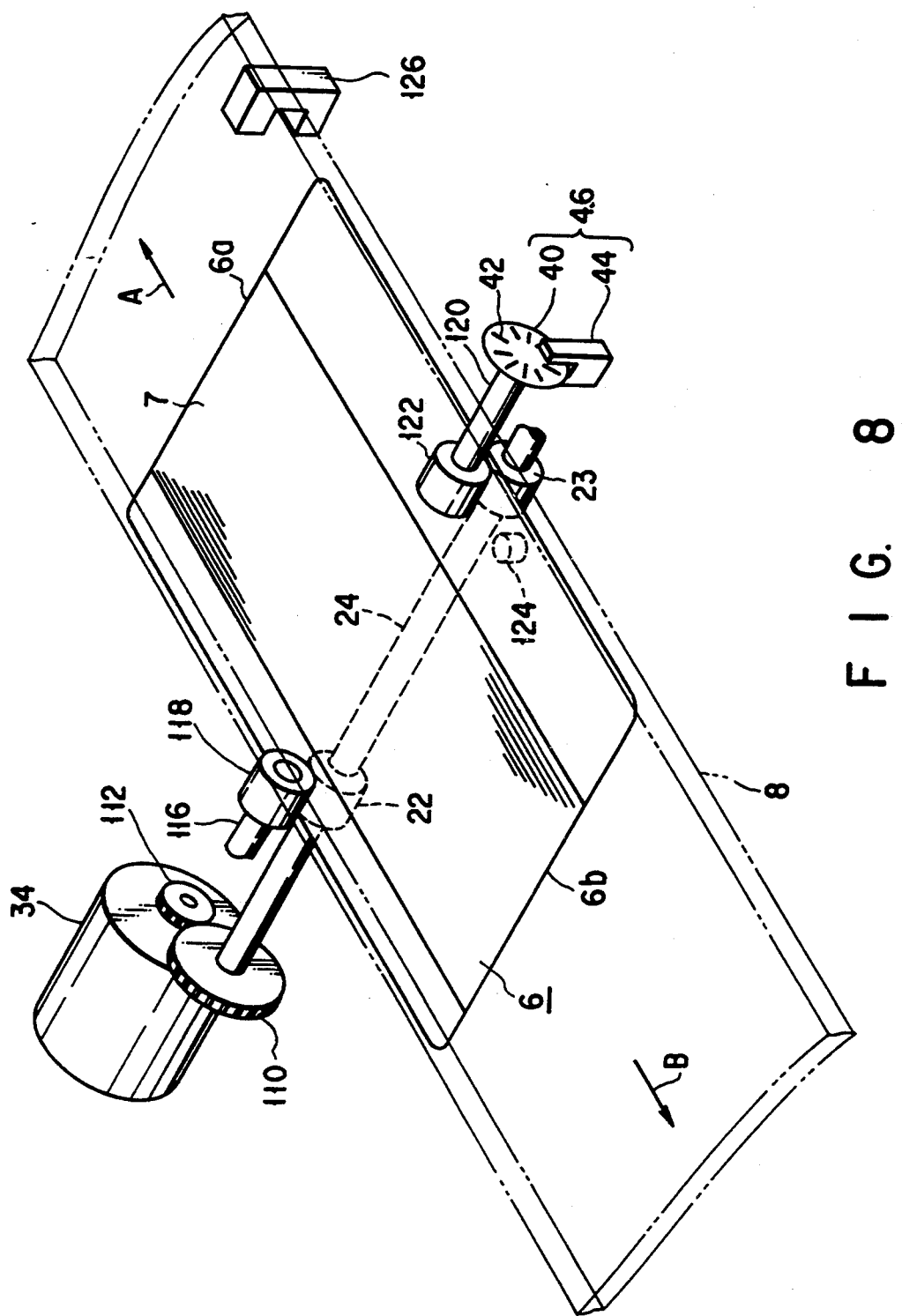
FIG. 8 is a perspective view showing an internal structure of the apparatus shown in FIG. 7.

In FIG. 8, a first sensor 124 is provided in front of the driving shaft 24 below the convey path 8. The sensor 124 detects the state in which an insertion-side end portion 6a of the optical card 6 (i.e. a front end portion in the insertion direction A) has reached the driving rollers 22 and 23 and the first and second driven rollers 118 and 122. A U-shaped second sensor 126 is provided on the rear right side of the convey path 8. Part of the convey path 8 is interposed between arm portions of the sensor 126. The distal end portions of the arm portions of the U-shaped second sensor 126 detect the optical card 6 moving along the convey path 8. Specifically, the second sensor 126 detects the state in which a discharge-side end portion 6b (i.e. a front end portion in the discharge direction B) of the optical card 6 has reached the driving rollers 22 and 23 and first and second driven rollers 118 and 122. The sensor 126 is situated in such a position that when the insertion-side end portion 6a of the optical card 6 has reached the sensor 126, the discharge-side end portion 6b of the card 6 is slightly clamped by the rollers 22, 23, 118 and 122.

The optical head 12 is situated in the direction of movement of the optical card 6 in such a position that when the insertion-side end portion 6a of the optical card 6 has reached the second sensor 126, an emission beam from the light-emitting diode 14 is irradiated at a location slightly inward from the discharge-side end portion 6b.

The operation of the information reproducing apparatus according to the second embodiment will now be described.

Figure 7:
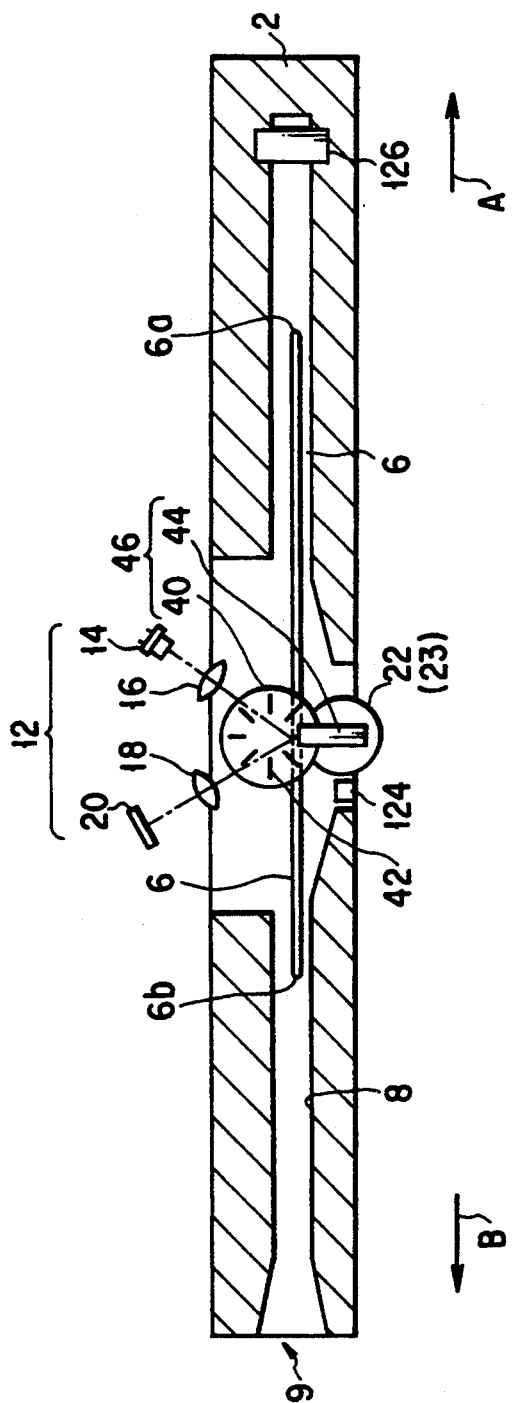
FIG. 7 is a cross-sectional view showing an apparatus according to a second embodiment of the invention.

The optical card 6 is inserted into the insertion hole 9 shown in FIG. 7. When the first sensor 124 detects the insertion-side end portion 6a of the card 6, the motor 34 (shown in FIG. 8) is driven to move the card 6 in the direction A. The second gear 112 rotates counterclockwise, as viewed from the encoder 46 in FIG. 8. The second gear 112 rotates the first gear 110 clockwise. Accordingly, the driving shaft 24 and driving rollers 22 and 23 rotate clockwise, thereby moving the optical card 6 in the direction A, i.e. the insertion direction. At this time, by pushing the card 6 slightly in the direction A, the insertion-side end portion 6a is clamped by the driving rollers 22 and 23 and first and second driven rollers 118 and 122 and guided in the direction A.

When the insertion-side end portion 6a of the optical card 6 is detected by the second sensor 126, the motor 34 is stopped and accordingly the rotation of the driving shaft 24 is stopped. Then, focus servo and tracking servo are effected to enable head driving means (not shown) to seek the optical head 12 in the transverse direction of the card 6 so that the emission beam from the light-emitting diode (shown in FIG. 7) is irradiated on a target track on the card 6. Thereafter, the optical card 6 is moved in the direction B by a desired distance to reproduce information.

During information reproduction, the rotation of the second driven roller 122 according to the movement of the optical card 6 is detected by the encoder unit 46, and a detection signal representing the rotation speed of the roller 122 is delivered to the control circuit 114 shown in FIG. 9. On the basis of the detection signal, the control circuit 114 detects the speed of the optical card 6, and delivers a speed command signal 128 to the motor 34 to set the speed of the card 6 at a desired value. Thus, the motor 34 is controlled. When the motor 34 cannot be controlled in accordance with the speed command signal 128 because of a limitation to the response frequency of the motor 34 or a mechanical time constant of the motor 34, the control circuit 114 generates a clock signal on the basis of the output from the encoder and controls the optical head 12 to reproduce information in synchronism with the clock signal. Thus, the variation in speed, which cannot be controlled, is substantially canceled.

In this manner, the speed of movement of the optical card 6 is detected and controlled, while information is reproduced. When the insertion-side end portion 6a moves from the second sensor 126 in the direction B by a desired distance, the motor 34 is stopped and movement of the optical card 6 is completed. The distance of movement of the card is detected by counting the output signal from the encoder unit 46.

Thereafter, the optical card 6 is moved alternately in directions A and B and the above operations are repeated. Thus, information reproduction is completed.

In the second embodiment, the distances between pits 130a to 130f of an information track 130 shown in FIG. 10 can be detected by the encoder unit 46 in the following manner.

In FIG. 10, information such as characters is represented by three pit distances A, B and C. When the optical card 6 is moved in either direction A or direction B (shown in FIG. 8), the optical head 12 detects the pits 130a to 130f successively. At this time, the encoder unit 46 detects a pulse signal 132, as shown in FIG. 10.

For example, as shown in FIG. 10, it is determined in advance that two pulses represent A-type information, three pulses represent B-type information and four pulses represent C-type information. In this case, it is possible to exactly detect A-type information between the pits 130a and 130b and B-type information between the pits 130b and 130c.

In addition, in the case of a method of recording information on the basis of the length of a pit, the length of the pit can be detected by using the output of the encoder.

The following advantages can be obtained by the structure of the present second embodiment:

(1) Since the speed of the card can be detected even when the driving rollers slip on the card, the card driving system is not easily influenced by a contamination such as oil on the card.

(2) Since the speed of the card can be detected with a simple structure, without using a card table, the apparatus is reduced in size, weight and manufacturing cost.

(3) Since the distance of movement of the card from the position of the card detected by the sensor or from a predetermined position on the card can be detected on the basis of the output signal from the encoder, the position control of the card can be performed.

In the second embodiment, the driven rollers (rotational members) are put in contact with the information recording surface of the card on which the information pattern is formed, and the rotation of the driven rollers can be detected. However, the same advantages can be obtained by bringing the driven rollers into contact with the surface opposite to the information recording surface or the side surface of the card. In addition, even if the stroke of movement of the card is long, it is possible to provide driven rollers at regular intervals along the length of the card and detect the rotations of the respective driven rollers.

A third embodiment of the invention will now be described with reference to FIGS. 11 to 14. The structural elements common to those in the second embodiment are denoted by same reference numerals, and only different parts will be described.

Figure 12:
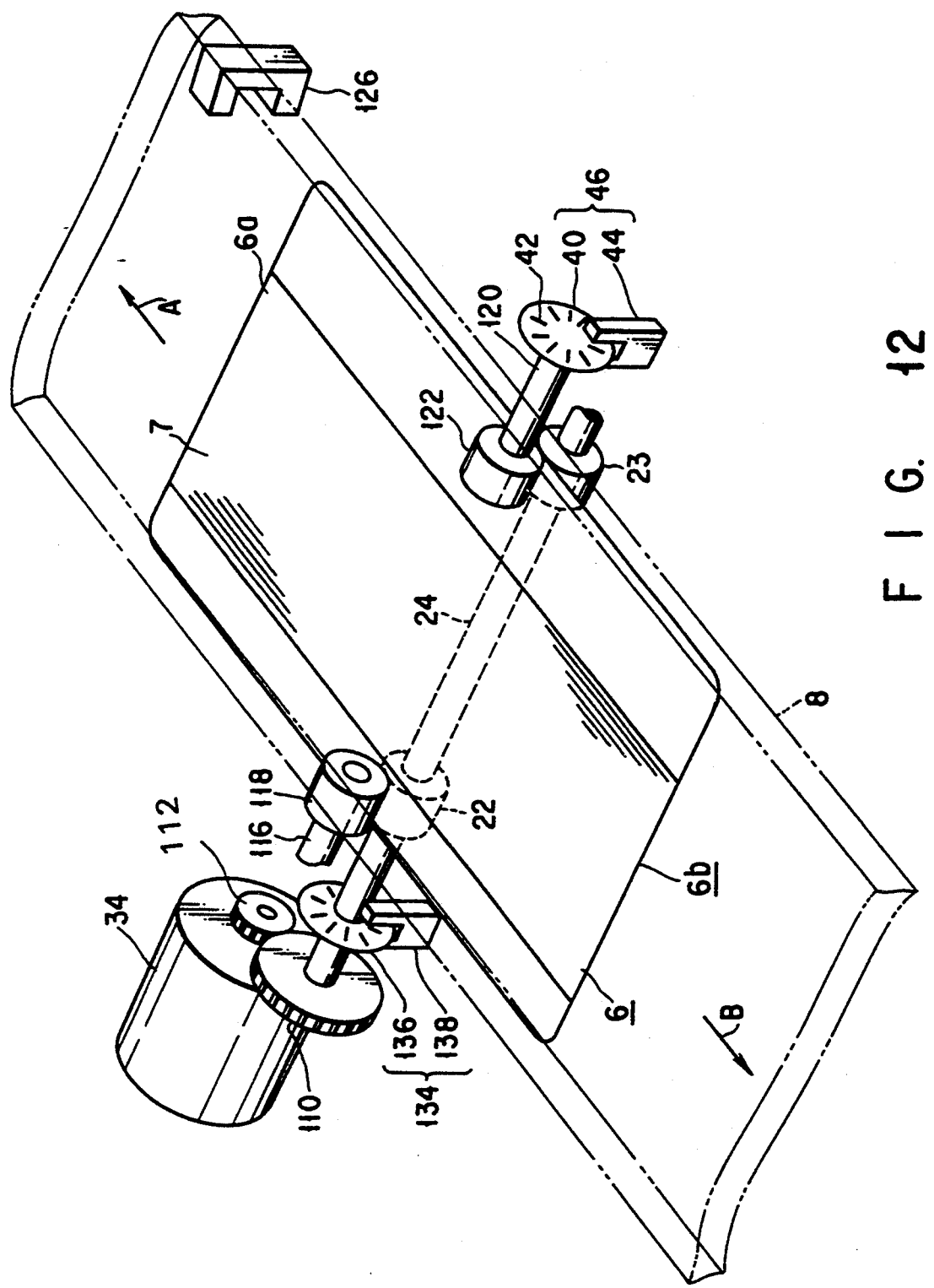
FIG. 12 is a perspective view showing an internal structure of the apparatus shown in FIG. 11.

In the third embodiment, as shown in FIG. 12, in addition to the encoder unit 46 used in the second embodiment, another encoder unit 134 of the same structure is provided. The encoder unit 46 is referred to as "first encoder" and the encoder unit 134 as "second encoder."

The second encoder 134 has a scale plate 136 and a detector 138. The scale plate 136 is attached to the driving shaft 24 driven by the motor 34. The detector 138 is mounted on the frame 2 (shown in FIG. 11) so as to detect the rotation of the scale plate 136.

The first encoder 46 detects the rotation of the second driven roller 122, and the second encoder 134 detects the driving amount of rotation of the driving rollers 22 and 23. In this case, if the four rollers 22, 23, 118 and 122 have the same diameter and the first and second encoders 46 and 134 have the same specifications, the output pulses from the two encoders 46 and 134 have the same cycle, as shown in FIG. 13, unless the driving rollers 22 and 23 slip on the optical card 6.

The first and second driven rollers 118 and 122 are journaled on the frame 2 so that they can be rotated by a very weak force. Thus, unless the frictional force between the optical card 6 and the first and second driven rollers 118 and 122 is excessively lowered by intentionally applying oil or the like to the card 6, the rollers 118 and 122 are rotated exactly in accordance with the movement of the card 6.

On the other hand, the driving rollers 22 and 23 move the card 6 by the frictional force acting therebetween. Thus, a slip occurs when the frictional force between the optical card 6 and driving rollers 22 and 23 becomes lower than the resistance force of the moving optical card 6, for example, owing to oil on the card 6.

In case such a slip occurs, the output pulses from the two encoders 46 and 134 have different cycles, as shown in FIG. 14. Specifically, the cycle of the output pulse from the first encoder 46 is greater than that of the output pulse from the second encoder 134.

Accordingly, when no slip occurs between the card 6 and the driving rollers 22 and 23, the cycles of the output pulses from the two encoders 46 and 134 are identical; when the slip occurs, they are different. Based on this, the condition of slip of the rollers 22 and 23 on the card 6 is determined, and the countermeasure to the slip can be taken quickly.

Thereby, the following advantages can be obtained:

(1) Degradation of reliability of data, which is caused by unstable movement of the optical card due to a slip, can be prevented.

(2) A slip of the driving rollers due to an initial-stage contamination can be detected, and the user is informed of the time at which cleaning of the rollers is needed.

(3) It is possible to prevent an undesirable situation from arising, in which the optical card cannot be conveyed or discharged due to a slip.

In this third embodiment, the scale plate 136 is attached to the driving shaft 24, but it may be attached to the output shaft of the motor 34. In the third embodiment, the two encoders having the same specifications are used. However, even when encoders of different specifications are used, if their output pulses are compared, a slip can be detected easily and the same advantages as in the second embodiment can be obtained.

The rotation of the driving rollers 22 and 23 can be detected without using the second encoder. Specifically, a brush motor is used as motor 34, and the variation in current value at the time the commutator of the brush motor is switched is counted. Alternatively, a brushless motor is used as motor 34, and an induction voltage occurring in the rotor of the brushless motor is utilized.

By using these methods, the rotation of the driving rollers 22 and 23 can be detected and the same advantages as in the second embodiment can be obtained while the number of structural parts is reduced.

Figure 15:
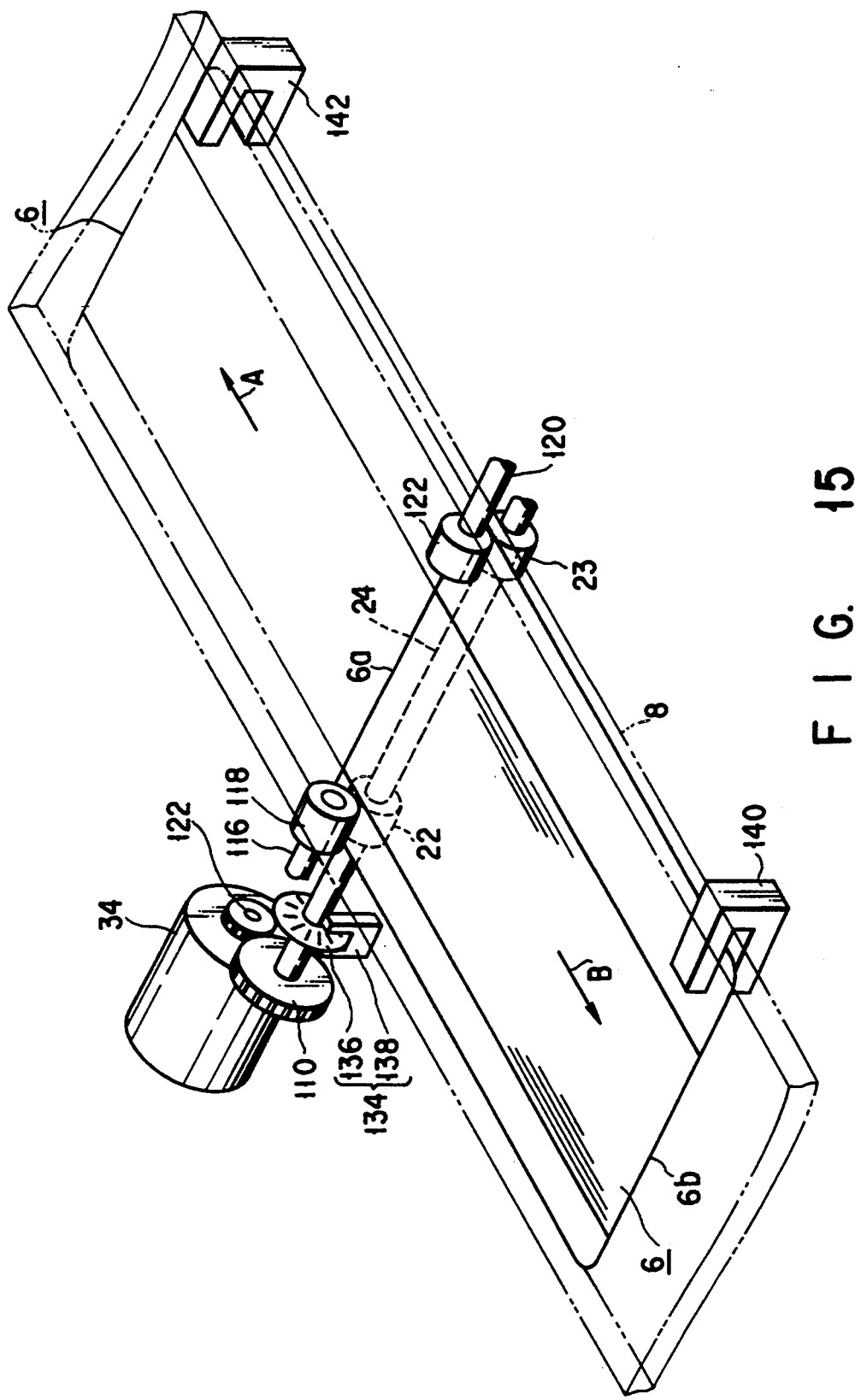
FIG. 15 is a perspective view showing a modification of the third embodiment.

A modification of the third embodiment will now be described with reference to FIG. 15.

In this modification, the first encoder 46 is replaced by the third and fourth sensors 140 and 142 which are transmission-type photosensors.

The third and fourth sensors 140 and 142 are disposed on one side of the convey path 8. The distance between the third sensor 140 and the driving and driven shafts 24 and 120 is set to be slightly less than the longitudinal length of the optical card 6. Thus, when the insertion-side end portion 6a of the optical card 6 is clamped between the driving rollers 22 and 23 and the first and second driven rollers 118 and 122, the discharge-side end portion 6b is detected by the third sensor 140. The distance between the fourth sensor 142 and the driving and driven shafts 24 and 120 is set similarly. Thus, when the discharge-side end portion 6b of the optical card 6 is clamped between the driving rollers 22 and 23 and the first and second driven rollers 118 and 122, the insertion-side end portion 6a is detected by the fourth sensor 142.

In this modification, when the optical card 6 is clamped between the driving rollers 22 and 23 and the first and second driven rollers 118 and 122 and moved in the direction A, the discharge-side end portion 6b is detected by the third sensor 140. Thereafter, the optical card 6 is further moved in the direction A, and the insertion-side end portion 6a is detected by the fourth sensor 142. At this time, the amount of rotation of the driving shaft 24 is measured by the second encoder 134.

The distance between the third sensor 140 and fourth sensor 142 is constant. Thus, when the driving rollers 22 and 23 do not slip on the optical card 6, the rotation of the driving shaft 24 is constant, and a predetermined desired amount of rotation coincides with the amount of rotation detected by the second encoder 134. When a slip occurs, the desired amount of rotation differs from the detected amount of rotation.

Accordingly, by comparing these amounts of rotation, the slip of the driving rollers 22 and 23 on the card 6 can easily be detected, as in the third embodiment, and the countermeasure to the slip can be taken quickly.

Figure 11:
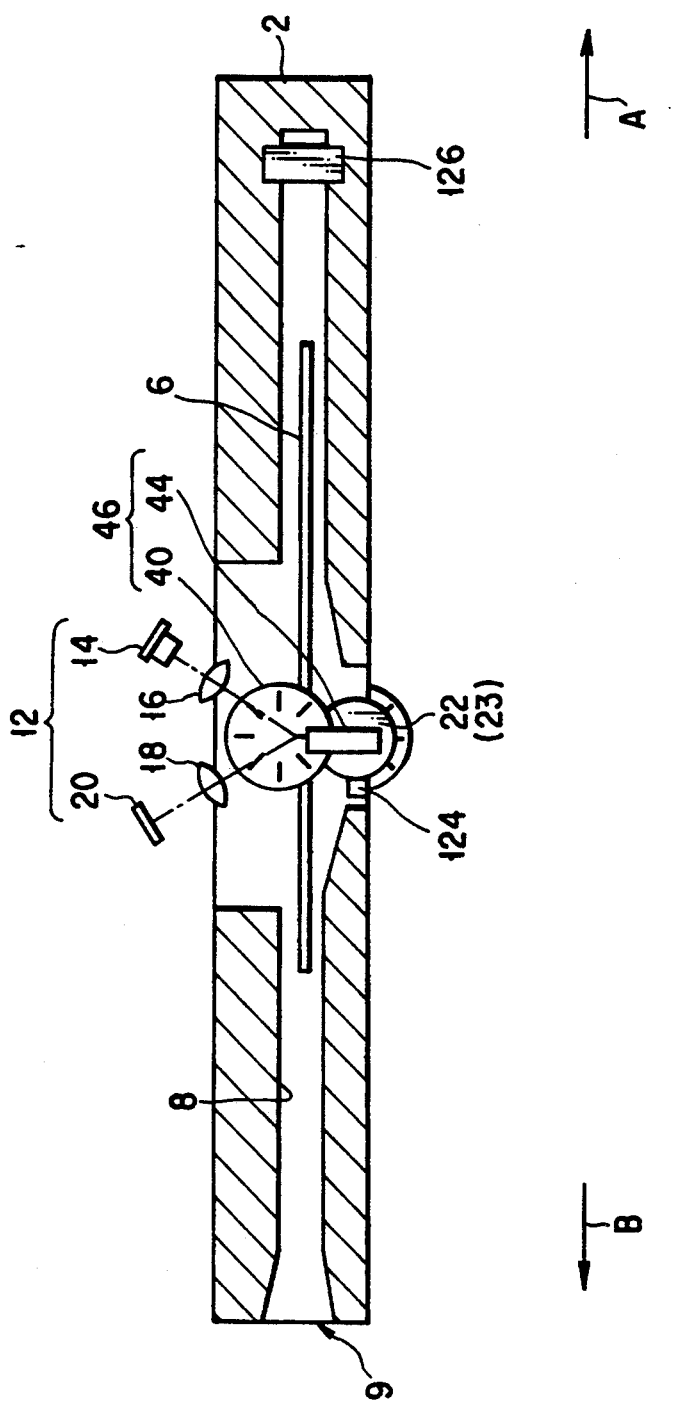
FIG. 11 is a cross-sectional view showing an apparatus according to a third embodiment of the invention.

Although the third sensor 140 is used to detect the end portion of the optical card 6 moved by the motor 34, it is possible to detect the end portion of the card 6 by the first sensor 124 shown in FIG. 11. Further, the insertion-side end portion 6a and discharge-side end portion 6b of the card 6 may be detected by a single sensor. Thereby, the number of structural parts can be reduced, and the same advantages as in the third embodiment can be obtained.

Although the transmission-type photosensors are used as third and fourth sensors 140 and 142, reflection-type photosensors, for example, may be used as sensors 140 and 142.

Instead of detecting the amount of rotation of the driving shaft 24, it is possible, for example, to count predetermined driving pulses for driving the motor 34.

Moreover, like the third embodiment, it is possible to detect the rotation of the driving rollers 22 and 23 without using the second encoder. Specifically, a brush motor is used as motor 34 and the variation in current value at the time the commutator of the brush motor is switched is counted. Alternatively, a brushless motor is used as motor 34, and an induction voltage occurring in the rotor of the brushless motor is utilized. By using these methods, the rotation of the driving rollers 22 and 23 can be detected and the same advantages as in the second embodiment can be obtained while the number of structural parts is reduced.

In the above three embodiments, the optical card with no clock pattern is used. However, it is possible to form a clock pattern on the optical card and detect the speed of the optical card on the basis of the output signal of the clock pattern.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical information recording/reproducing apparatus for recording/reproducing information on/from an optical card having a plurality of information tracks, said apparatus comprising:
    a frame having a convey path for the optical card;
    an optical head for recording/reproducing information on/from the optical card, said optical head being movable in a direction perpendicular to information tracks on the optical card;
    drive means for moving the optical card relative to the optical head;
    movement amount detecting means for detecting the amount of movement of the optical card; and
    driving amount detecting means, separate from said movement amount detecting means, for detecting a driving amount of the drive means, in order to detect an amount of slip of said drive means relative to the optical card.

2. The apparatus according to claim 1, wherein said movement amount detecting means has a rotational member in contact with the optical card to rotate in accordance with the movement of the optical card.

3. The apparatus according to claim 1, wherein said drive means includes a brush motor having a commutator, said driving amount detecting means detecting the driving amount on the basis of a variation in current value at the time the commutator is switched.

4. The apparatus according to claim 1, wherein said drive means includes a brushless motor having a rotor, said driving amount detecting means detecting the driving amount on the basis of an induction voltage occurring in the rotor.

5. The apparatus according to claim 1, wherein said movement amount detecting means includes a rotational member rotatably driven by said optical card.

6. The apparatus according to claim 5, wherein said movement amount detecting means further includes:
    rotatable shaft means for supporting said rotational member, said rotational member being fixed on said shaft means,
    a scale plate fixed on said shaft means, said scale plate having a recognition pattern thereon, and
    detector means for reading said recognition pattern during rotation of said scale plate with said shaft means, for use in determining the amount of movement of said optical card.

7. The apparatus according to claim 1, wherein said driving amount detecting means includes a rotational member rotatably driven by said drive means.

8. The apparatus according to claim 7, wherein said driving amount detecting means further includes:
    rotatable shaft means for supporting said rotational member, said rotational member being fixed on said shaft means,
    a scale plate fixed on said shaft means, said scale plate having a recognition pattern thereon, and
    detector means for reading said recognition pattern during rotation of said scale plate with said shaft means, for use in determining slip of said drive means relative to the optical card.

9. An optical information recording/reproducing apparatus for recording/reproducing information on/from an optical card having a plurality of tracks, said apparatus comprising:
    a frame having a convey path for the optical card;
    an optical head for recording/reproducing information on/from the optical card, said optical head being movable in a direction perpendicular to information tracks on the optical card;
    means for moving the optical card relative to the optical head; and
    means for detecting the amount of movement of the optical card,
    wherein said detecting means includes:
    a rotational member directly contacting the optical card to rotate in accordance with the movement of the optical card,
    rotatable shaft means for supporting said rotational member, said rotational member being fixed on said shaft means,
    a scale plate fixed on said shaft means, aid scale plate having a recognition pattern thereon, and
    detector means for reading said recognition pattern during rotation of said scale plate with said shaft means, for use in determining the amount of movement of said optical card.

10. The apparatus according to claim 9, wherein said rotational member has a rotational center axis extending in the direction of movement of the optical head.

11. The apparatus according to claim 10, wherein said moving means includes means for rotating the rotational member to move the optical card.

12. The apparatus according to claim 9, wherein said rotational member is rotatably driven by said optical card.

* * * * *